US 8,441,951 B2

(12) United States Patent
Kazmi et al.

(10) Patent No.: US 8,441,951 B2
(45) Date of Patent: May 14, 2013

(54) CONFIGURATION MEASUREMENT TIME SLOTS FOR MOBILE TERMINALS IN A TDD SYSTEM

(75) Inventors: Muhammad Kazmi, Bromma (SE); David Astely, Bromma (SE)

(73) Assignee: Telefonatiebolaget LM Ericsson (PUBL), Stockholm (SE)

( * ) Notice: Subject to any disclaimer, the term of this patent is extended or adjusted under 35 U.S.C. 154(b) by 276 days.

(21) Appl. No.: 12/863,861

(22) PCT Filed: Dec. 5, 2008

(86) PCT No.: PCT/SE2008/051412
§ 371 (c)(1),
(2), (4) Date: Jul. 21, 2010

(87) PCT Pub. No.: WO2009/096846
PCT Pub. Date: Aug. 6, 2009

(65) Prior Publication Data
US 2010/0296410 A1   Nov. 25, 2010

Related U.S. Application Data

(60) Provisional application No. 61/024,655, filed on Jan. 30, 2008.

(51) Int. Cl.
*H04J 1/16* (2006.01)
*H04B 7/212* (2006.01)

(52) U.S. Cl.
USPC ............ 370/252; 370/330; 370/337; 370/347

(58) Field of Classification Search .................. 370/252, 370/330, 337, 347
See application file for complete search history.

(56) References Cited

U.S. PATENT DOCUMENTS

| 2002/0057667 | A1* | 5/2002 | Hamalainen et al. ......... 370/347 |
| 2004/0208148 | A1 | 10/2004 | Cooper |
| 2004/0223483 | A1 | 11/2004 | Cooper |
| 2004/0258017 | A1 | 12/2004 | Beard |

(Continued)

FOREIGN PATENT DOCUMENTS

| CN | 1516491 A | 7/2004 |
| CN | 1806463 A | 7/2006 |

(Continued)

OTHER PUBLICATIONS

International Search Report for PCT/SE2008/051412, mailed Apr. 17, 2009.

(Continued)

*Primary Examiner* — Andrew Lee
(74) *Attorney, Agent, or Firm* — Nixon & Vanderhye, P.C.

(57) ABSTRACT

The technology applies to a cellular radio network where each cell area is associated with a radio base station in which mobile terminals communicate with at least one of the base stations over a radio interface. The mobile terminals perform mobility-related measurements on downlink signals received from a corresponding neighbor cell during time slots configured for downlink transmission measurement. A configuration node receives input information, and based on that received input information, determines measurement time slot configuration information. The node provides the measurement time slot configuration information to the base stations so that the base stations may signal the measurement time slot configuration information to mobile terminals.

45 Claims, 7 Drawing Sheets

U.S. PATENT DOCUMENTS

| | | | |
|---|---|---|---|
| 2004/0258037 A1 | 12/2004 | Beard | |
| 2004/0258038 A1 | 12/2004 | Beard | |
| 2005/0002374 A1 | 1/2005 | Beard | |
| 2005/0075125 A1* | 4/2005 | Bada et al. | 455/525 |
| 2005/0135327 A1 | 6/2005 | Cooper | |
| 2007/0270155 A1* | 11/2007 | Nelson et al. | 455/452.2 |
| 2007/0291644 A1* | 12/2007 | Roberts et al. | 370/230.1 |
| 2008/0192660 A1* | 8/2008 | Li et al. | 370/294 |
| 2009/0005107 A1* | 1/2009 | Esmailzadeh et al. | 455/522 |
| 2009/0046605 A1* | 2/2009 | Gao et al. | 370/280 |
| 2010/0087152 A1* | 4/2010 | Mourad | 455/67.11 |
| 2010/0118694 A1* | 5/2010 | Shibata | 370/210 |

FOREIGN PATENT DOCUMENTS

| | | |
|---|---|---|
| EP | 1 465 449 A1 | 10/2004 |
| EP | 1 465 499 | 10/2004 |
| EP | 1 489 875 | 12/2004 |
| EP | 1 489 875 A1 | 12/2004 |
| WO | WO 2004/091245 A2 | 10/2004 |
| WO | WO 2004/114713 A1 | 12/2004 |

OTHER PUBLICATIONS

ETSI: "3GPP TS 25.331—Radio Resource Control—Protocol Specification", Jan. 1, 1900, XP014036346.

Ericsson: "R2-063227 Idle Gaps for Handover Measurements in E-UTRAN", Internet Citation, [online] Nov. 6, 2006, XP002470104, Retrieved from the Internet: http://www.3gpp.org/ftp/tsg_ran/WG2_RL2/TSGR2_56/Documents/.

Sharp: "R2-062928 Measurement Gap Control for E-UTRAN", Internet Citation, [online] Oct. 9, 2006, XP002470106, Retrieved from the Internet: http://www.3gpp.org/ftp/tsg_ran/WG2_RL2/TSGR2_55/Documents/>.

3GPP: "3GPP TS 36.214: "Evolved Universal Terrestrial Radio Access, (E-UTRA); Physical layer; Measurements""[online] Nov. 1, 2007, XP002522575 3GPP Retrieved form the Internet: http://www.3gpp.org/FTP/Specs/html-info/36214.htm>.

3GPP TSG-RAN WG2 Meeting #56, Riga, Latvia, Nov. 6-10, 2006, R2-063227, XP-002470104; 6 pp.

3GPP TSG-RAN WG2#55; R2-062928, Seoul, Korea, Oct. 9-13, 2006, 5 pp.

ETSI TS 125 331 V7.3.0 (Dec. 2006), Release 7, pp. 1-719.

R2-063227, 3GPP TSG-RAN WG2 Meeting #56, Riga, Latvia, "Idle Gaps for Handover Measurements in E-TRAN", Internet Citation, Nov. 6, 2006.

R2-062928, 3GPP TSG-RAN WG2#55, "Measurement Gap Control of E-UTRAN", Internet Citation, Seoul, Korea, Oct. 9, 2006.

3GPP TS 36.214 V8.1.0, $3^{rd}$ Generation Partnership Project; Technical Specification Group Radio Access Network; Evolved Universal Terrestrial Radio Access (E-UTRA); Physical Layer—Measurements, (Release 8), (Nov. 2007).

3GPP TS 36.213 V9.1.0, $3^{rd}$ Generation Partnership Project; Technical Specification Group Radio Access Network "Evolved Universal Terrestrial Radio Access (E-UTRA); Physical Layer Procedures" (Release 9) (Mar. 2010).

3GPP TS 36.104 V9.3.0, $3^{rd}$ Generation Partnership Project; Technical Specification Group Radio Access Network; "Evolved Universal Terrestrial Radio Access (E-UTRA); Base Station (BS) radio transmission and reception" (Release 9), (Mar. 2010).

Chinese Office Action issued in Chinese Patent Application No. 200880126224.X dated Dec. 27, 2012 with English Translation.

* cited by examiner

CONFIGURATION MEASUREMENT TIME SLOTS FOR MOBILE TERMINALS IN A TDD SYSTEM

PRIORITY APPLICATION

This application is the U.S. national phase of International Application No. PCT/SE2008/051412, filed 5 Dec. 2008, which claims priority to U.S. Application No. 61/024,655, file Jan. 30, 2008, the entire contents of each of which is hereby incorporated by reference.

TECHNICAL FIELD

The technical field pertains to telecommunications, and particularly to controlling/performing downlink measurements.

INTRODUCTION

In a typical cellular radio system, mobile radios (also known as mobile stations, wireless terminals, and/or user equipment units (UEs)) communicate via a radio access network (RAN) to one or more core networks. The wireless terminals can be mobile stations or user equipment units (UE) such as mobile telephones ("cellular" telephones) and laptops with wireless capability), e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "eNodeB". A cell is a geographical area where radio coverage is provided by the radio base station equipment at a base station site. Each cell is identified by a physical cell identity (PCI) and a cell global identity (CGI). The former is reused since there is a limited number of available PCIs, e.g., 510 PCIs in E-UTRAN. The name PCI stems from the fact that it is encoded in physical layer synchronization sequences, which should be decoded by the UE in order to identify a cell (i.e., the PCI of a cell). The latter, i.e., CGI, is unique in the entire network and is broadcasted via higher layers by each cell. The base stations communicate over the air interface operating on radio frequencies with the user equipment units (UE) within range of the base stations.

In some versions (particularly earlier versions) of the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN is essentially a radio access network using wideband code division multiple access for user equipment units (UEs). The Third Generation Partnership Project (3GPP) has undertaken to evolve further the UTRAN and GSM based radio access network technologies.

Specifications for the Evolved Universal Terrestrial Radio Access Network (E-UTRAN) are ongoing within the 3$^{rd}$ Generation Partnership Project (3GPP). The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology wherein the radio base station nodes are connected directly to a core network rather than to radio network controller (RNC) nodes. In general, in LTE the functions of a radio network controller (RNC) node are performed by the radio base stations nodes. As such, the radio access network (RAN) of an LTE system has an essentially "flat" architecture comprising radio base station nodes without reporting to radio network controller (RNC) nodes.

The evolved UTRAN (E-UTRAN) comprises evolved base station nodes, e.g., evolved NodeBs or eNBs, providing evolved UTRA user-plane and control-plane protocol terminations toward the user equipment unit (UE). The eNB hosts the following functions (among other functions not listed): (1) functions for radio resource management (e.g., radio bearer control, radio admission control), connection mobility control, dynamic resource allocation (scheduling); (2) mobility management entity (MME) including, e.g., distribution of paging message to the eNBs; and (3) User Plane Entity (UPE), including IP Header Compression and encryption of user data streams; termination of U-plane packets for paging reasons, and switching of U-plane for support of UE mobility. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of DL/UL user plane packet headers. The eNode Bs are interconnected and communicate with each other via an X2 interface. Each eNode B is also directly connected to one or more access gateways (i.e., a core network).

2G and 3G systems, including E-UTRAN, make use of Mobile Assisted handover (MAHO). Each user equipment unit (UE) periodically monitors the signal quality of the serving base station (BS) as well as the signal quality of base stations in its surroundings and may report the measurements back to the serving radio base station. The radio network typically initiates handovers based on these measurements.

E-UTRAN system may operate in all well known duplex modes including frequency division duplex (FDD), time division duplex (TDD), and half duplex. See, e.g., 3GPP TS 36.213, "Evolved Universal Terrestrial Radio Access (E-UTRA); Physical layer; Procedures."

In the frequency division duplex (FDD) mode of operation used in E-UTRAN, uplink and downlink transmission take place on different carrier frequency channels. Therefore, in FDD mode, both uplink and downlink transmissions can occur simultaneously in time during a frame. A UE can use any of the downlink slots for performing downlink measurements.

In the time division duplex (TDD) mode, the uplink and downlink transmission take place on the same carrier frequency channel but in different time slots or time frames or sub-frames. As a result, the UE can use only a sub-set of slots for performing mobility-related, downlink measurements. The number of downlink and the number of uplink time slots in a frame is configurable to support downlink and uplink asymmetrical traffic requirements.

In the half duplex mode, uplink and downlink transmissions take place on different carrier frequencies and also occur on different time slots. This means uplink and downlink transmission do not occur simultaneously. As in TDD, in the half-duplex mode, the UE cannot use all downlink slots for carrying out downlink measurements. In fact, the number of consecutive slots for receiving data and doing measurements depends upon UE capability.

FIG. 1 shows an example E-UTRAN TDD frame structure. The frame is 10 ms long with two 5 ms half frames. Each time slot is of 0.5 ms long. In each half frame the first consecutive time slots are typically used for downlink transmission. The downlink time slots contain known reference signals, e.g., pilot signals, which can be used for downlink demodulation as well as for performing downlink neighbor cell measurements. Both 5 ms and 10 ms periodicities of sending reference signals are supported. For 5 ms periodicity, the configuration of the two 5 ms half frames is the same and the duration of the downlink pilot (DwPTS), the guard period (GP), and the uplink pilot (UpPTS) combined is 1 ms. For 10 ms periodicity, which is shown in the example of FIG. 1, the downlink pilot (DwPTS) has a duration of 1 ms in the second 5 ms half frame, and the uplink pilot (UpPTS) and the guard period (GP) are only present in first 5 ms half frame.

Neighbor cell downlink measurements are needed to support mobility. Mobility includes initial cell selection, cell reselection, and handover between cells. The cells involved in a handover can belong to different serving carrier frequencies, different carrier frequencies, and different radio access technologies, e.g., E-UTRAN and UTRAN. The neighbor cell measurements are performed on known reference symbols or pilot sequences, e.g., the UEs measure downlink pilot (DwPTS) signals broadcast by neighboring base stations. Unlike other measurements, such as channel quality indicator (CQI) which is done on transmission time interval (TTI) level (e.g., 1 ms), mobile radios perform neighbor cell measurements over a longer time duration on the order of few 100 ms.

There is often a requirement for the UE to measure and report the measurement quantities (e.g., RSRP and RSRQ) from at least a certain number of identified cells, e.g., eight cells including one serving cell and seven neighbor cells, all on the serving carrier frequency (i.e., the eight cells are "intra-frequency cells"). Furthermore, the reported measurement quantities should fulfill relevant performance requirements, e.g., absolute and relative accuracies, etc.

As shown in FIG. 1, in E-UTRAN TDD, reference symbols, which are sent with a certain pattern defined in time and frequency. Unlike FDD where the pattern repeats in every slot in each frame, in TDD, the downlink reference symbols are sent in only a sub-set of slots per frame, i.e., only in the downlink slots. The downlink measurements are described, e.g., in 3GPP TS 36.214, "Evolved Universal Terrestrial Radio Access (E-UTRA); Physical layer; Measurements," and include or involve measuring:

1. Reference symbol received power (RSRP)
2. Reference symbol received quality (RSRQ); RSRQ=RSRP/RSSI, where RSSI stands for carrier received signal strength indicator.

RSRP is measured over just the downlink reference symbol, and carrier RSSI, which is part of RSRQ, is measured over the entire sub-carrier where each sub-carrier contains both reference symbols and data. Furthermore, RSRP is a signal, whereas RSRQ is a signal quality type measurement.

The above measurements are radio-related. There may also be a timing-related measurement such as time difference between serving and target cells. The technology described herein equally applies to any timing-related measurement in addition to the radio-related measurements.

One objective of neighbor cell measurements is to average out the effect of small scale fading, sometimes described as fast fading. The reason for filtering fast fading is to prevent a ping-pong effect caused by cell reselection or handover. In other words, the goal of averaging neighbor cell measurements is to minimize unnecessary cell changes. Towards this end, the UE must collect a number of measurement samples at regular intervals over a measurement period. For instance, in a measurement period of 200 ms, the UE might make 3 or 4 measurement snapshots. The combination of measurements for the measurement period is used to generate an average. In the example, the average is generated from the 3-4 measurement snapshots made over 200 ms period.

There are two types of averaging: coherent averaging and non-coherent averaging. Coherent averaging is performed over a time period in which the radio channel characteristics remain unchanged or vary insignificantly. Coherent averaging depends upon a particular channel and its coherence bandwidth. As one example, coherent averaging might be performed over 2-4 consecutive downlink slots (e.g., over 1-2 ms) depending upon the channel type. Alternatively, the UE may use the same number of consecutive slots (e.g., 3 slots) irrespective of channel behavior. Non-coherent averaging is performed using measurement samples where the radio channel may have changed from one measurement to the next. In other words, the measurement samples are non-coherent because they are uncorrelated with respect to radio channel characteristics. Non-coherent measurement samples can include two or more coherently-averaged measurement samples. An example of E-UTRAN TDD measurement averaging is shown in FIG. 2. In the first averaging of consecutive samples on the left, the channel is fairly constant so that the averaging is coherent. The consecutive samples taken in the middle are indicated as non-coherent because the radio channel has changed during that "snapshot." Over the entire measurement interval, in one example 200 ms, the radio channel is assumed to have changed so that the averaging is non-coherent.

The E-UTRAN TDD system allows for several different cell transmission bandwidths, e.g., 1.4 MHz, 3 MHz, 5 MHz, 10 MHz, 15 MHz, 20 MHz, etc. (see 3GPP TS 36.104, "Evolved Universal Terrestrial Radio Access (E-UTRA); Base Station (BS) radio transmission and reception"). Consequently, it is possible to adjust the measurement bandwidth according to the available cell bandwidth in a particular deployment scenario. In general, a wider bandwidth will provide for more pilot/reference signals to be measured at different frequencies in the band resulting in better averaging. By factoring in frequency bandwidth, acceptable measurement performance can be achieved by taking fewer time domain samples but by measuring each sample over a larger frequency bandwidth.

The trade off between time domain and frequency domain filtering means that shorter time domain with larger frequency domain averaging or vice versa can be used to ensure that an objective of the measurement is achieved, e.g., fast fading is properly filtered out. A E-UTRAN TDD system can operate over a bandwidth larger than a minimum bandwidth, e.g., larger than 1.4 MIL in the current E-UTRAN TDD. Thus, time domain and frequency domain filtering can be traded-off in E-UTRAN TDD.

UEs make intra-frequency mobility measurements on broadcasts from cells operating using the same carrier frequency as the serving cell. For intra-frequency mobility measurements, it is beneficial from a complexity perspective to perform more time domain averaging than frequency domain averaging. More time domain averaging reduces UE complexity because the UE simultaneously receives data from the serving cell, (i.e., the intra-frequency cell), and performs intra-frequency measurements. Thus, it needs more resources (e.g., extra fast Fourier transform (FFT) resources) if a larger measurement bandwidth is used for measurement. This is because some form of parallel processing would be required since both tasks are done on the same carrier (intra-frequency).

In addition to intra-frequency measurements, a UE may make inter-frequency mobility measurements on cells operating on different carrier frequency than that of the serving cell during idle gaps which are typically repeated periodically or with some well-defined pattern. The gap pattern is characterized by both a gap length and a periodicity of the occurrence of the gap; the gap pattern is configured by the network. For example, two different gap patterns could be specified: one with 40 ms and another with 80 ms periodicity with a gap length of 6 ms for both patterns. During such gaps, the UE can tune to the different carrier and perform inter-frequency measurements. The objective is for the measurement quantity to achieve a certain measurement accuracy. There is a tradeoff between measurement period and measurement bandwidth. Accordingly, the desired measurement accuracy can be achieved by finding a suitable combination of measurement period and measurement bandwidth. Consider E-UTRAN as an example. Because cell bandwidth can be large, e.g., up to 20 MHz, the larger measurement bandwidth permits a reduced measurement time period while still providing a desired accuracy and mobility performance. As one non-limiting illustration, the following combinations provide equivalent accuracy and measurement performance of RSRP or RSRQ: (1) 1.4 MHz of measurement bandwidth in the frequency domain and 480 ms measurement period in the time domain, and (2) 10 MHz of measurement bandwidth in the frequency domain and 240 ms measurement period in the time domain. This example demonstrates that there is a tradeoff between measurement bandwidth and time domain averaging.

During the idle gaps, the UE does not receive data, and therefore, it can devote more or all of its resources to doing mobility measurements. Consequently, using a larger measurement bandwidth for performing inter-frequency measurements avoids the need to increase the capacity and/or complexity of the measuring UEs.

Discontinuous reception (DRX) may be used by UEs in E-UTRAN TDD to save battery power while the UE is in connected mode. But while in the DRX mode, a UE has less opportunity to perform mobility measurements and can only collect the mobility measurement samples at wake-up times. In order to collect proper coherent and non-coherent measurement samples, the UE may need to "stay awake" for a slightly longer duration.

This problem is compounded by the limited number of consecutive downlink time slots in E-UTRAN TDD, which means that a non-coherent measurement sample is collected over a considerably longer duration than is the case for E-UTRAN FDD where all downlink slots are available for measurements. The impact of this larger measurement time period in TDD can adversely affect UE power consumption in DRX mode since, on average, the UE must stay awake for a longer duration. Further drain on the UE battery occurs when the UE has to measure over several identified cells.

In light of all these variables, it would be desirable to inform UEs—via one or more base stations—of the number of downlink time slots in a TDD system, e.g., an E-UTRAN TDD system, during which the UEs can perform downlink mobility measurements. If that number of downlink mobility measurement slots is adaptable to take into account changing conditions that affect the mobility measurement process, then it would also be desirable to reconfigure the number of downlink measurement slots and inform the UEs of that reconfigured number in order to achieve more optimal performance.

Other objects are desirable. One is to advise the base stations if it is not necessary to use all available downlink time slots for UE measurements. Another is to inform base stations in different parts of a coverage area that use the same carrier frequency of different numbers of downlink measurement slots to be used in those different parts when appropriate. A third is to inform UEs of the number of uplink and downlink time slots in all or a sub-set of cells. A fourth is to inform UEs of the number of downlink measurement time slots in all or a sub-set of cells when a base station is added or removed, e.g., a home Node B is added or removed. Given the trade off between frequency domain and time domain averaging, a fifth desirable object is to permit the network to use fewer time slots and a larger bandwidth for UE downlink measurements, especially for inter-frequency downlink measurements, if a larger bandwidth is deployed in significant number of cells.

SUMMARY

The technology in this application meets these and other objectives. The technology applies to a cellular radio network where each cell area is associated with a radio base station in which mobile terminals communicate with at least one of the base stations over a radio interface. The mobile terminals perform mobility-related measurements on downlink signals received from a corresponding neighbor cell during time slots configured for downlink transmission measurement. A configuration node receives input information, and based on that received input information, determines measurement time slot configuration information. The node provides the measurement time slot configuration information to the base stations so that the base stations may signal the measurement time slot configuration information to mobile terminals. As one example, the neighbor cell measurements include reference symbol received power and carrier received signal strength.

Various non-limiting example embodiments and/or features may be employed. For example, at least one measurement time slot may be configured for each carrier frequency. The input information includes one or more carrier frequencies used in each of the cells. The measurement time slot configuration information provided to the base stations indicates at least one measurement time slot for each carrier frequency.

As another example embodiment, the input information may include uplink time and downlink slot allocations on each radio frequency carrier in each of the cells. The measurement time slot configuration information provided to the base stations indicates a minimum number of downlink measurement time slots for each carrier in all cells and a larger number of downlink measurement time slots for each carrier in one or more of those cells.

The input information may include one or both of (1) a maximum transmission bandwidth of cells on a radio frequency carrier for each radio frequency carrier or (2) a minimum transmission bandwidths of cells on a radio frequency carrier for each radio frequency carrier. The measurement time slot configuration information provided to the base stations indicates a lower number of downlink measurement time slots if a transmission bandwidth available in each cell is greater than a bandwidth threshold or a higher number of downlink measurement time slots if a transmission bandwidth available in each cell is less than or equal to the bandwidth threshold.

The input information may include radio condition information. The measurement time slot configuration information provided to the base stations indicates a higher number of downlink measurement time slots if the radio condition information reflects slower radio channel conditions characterized by lower Doppler and lower delay spread and a lower number of downlink measurement time slots if the radio condition information reflects faster radio channel conditions characterized by higher Doppler and higher delay spread.

During idle gaps, mobile terminals may make inter-frequency measurements on broadcasts from neighboring cells operating using a different downlink carrier frequency than in a serving cell for each mobile terminal. The input information includes idle gap periodicity information. The measurement time slot configuration information provided to the base stations indicates a higher number of downlink measurement time slots if a periodicity of an idle gap occurrence is greater than a threshold and a lower number of downlink measurement time slots if the periodicity of the idle gap occurrence is less than or equal to the threshold.

The input information may include whether the mobile radios are to make intra-frequency measurements or inter-frequency measurements. The measurement time slot configuration information provided to the base stations indicates a higher number of downlink measurement time slots for intra-frequency measurements and a lower number of downlink measurement time slots for inter-frequency measurements.

The input information may include whether the mobile radios are to make intra-frequency measurements or inter-frequency measurements. The measurement time slot configuration information provided to the base stations indicates a higher number of downlink measurement time slots for intra-frequency measurements and a lower number of downlink measurement time slots for inter-frequency measurements. Alternatively, the input information may include whether the mobile radios are to make inter-frequency measurements, the measurement time slot configuration information provided to the base stations indicates (1) a lower number of downlink measurement time slots if inter-frequency measurements are performed over bandwidth larger than a first threshold or (2) a higher number of downlink measurement time slots if inter-frequency measurements are performed over bandwidth lower than a second threshold.

The input information may include discontinuous reception (DRX) cycle information, and the measurement time slot configuration information provided to the base stations indicates a higher number of downlink measurement time slots for intra-frequency measurements and a relatively lower number of downlink measurement time slots for inter-frequency measurements.

The input information may include base station or cell deployment information or cell planning modification information. The measurement time slot configuration information provided to the base stations indicates a different number of downlink measurement time slots based on the base station or cell deployment information or the cell planning modification information.

If the input information includes radio resource management information, then the measurement time slot configuration information provided to the base stations may vary depending on the radio resource management information. One example of such radio resource management information is a gap pattern in use for performing measurements.

The measurement time slot configuration information preferably includes an optimal number of downlink timeslots during which the mobile terminals should make the neighbor cell measurements. The optimal number is variable depending on input information.

The configuration node may be a dedicated node connected to the plural base stations, an operational and maintenance node connected to the plural base stations, or one of the plural base stations acting as a master base station. Alternatively, plural ones of the plural base stations may be configuration nodes in a distributed arrangement.

In an example embodiment in which the configuration node is one of the plural base stations acting as a master base station, the configuration node can be connected to other base stations via an X2 interface in an E-UTRAN system and can be configured to receive the required set of information via the X2 interface. The configuration node can be configured to signal one or more measurement time slot parameters to the plural base stations via the X2 interface in the E-UTRAN system. In an E-UTRAN example, the measurement time slot corresponds to a sub-frame.

The neighbor cell measurements may include a signal strength measurement such as reference symbol received power (RSRP) and/or a signal quality measurement such as reference symbol received quality (RSRQ).

In an example embodiment, each of the base stations signals one or more configured measurement time slot parameters to the mobile terminals for performing downlink measurements. Each of the base stations can be configured to signal one or more configured measurement time slot parameters via system information broadcast to the mobile terminals in idle mode for performing downlink neighbor cell measurements, and each base station can be configured to signal one or more configured measurement time slot parameters via a dedicated or shared data channel to the mobile terminals in connected mode for performing downlink neighbor cell measurements.

At a receiving one of the base stations, mobility-related measurement time slot configuration information is received from the configuration node. That base station transmits the mobility-related measurement time slot configuration information to mobile terminals in or near a cell associated with the one base station.

DETAILED DESCRIPTION

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes described may be substantially represented in a computer-readable medium and can be executed by a computer or processor.

The functions of the various elements including functional blocks labeled or described as "processor" or "controller" or "computer" may be provided through the use of dedicated hardware as well as hardware capable of executing software. When provided by a processor, the functions may be provided by a single dedicated processor, by a single shared processor, or by a plurality of individual processors, some of which may be shared or distributed. Moreover, a "processor" or "controller" may include, without limitation, digital signal processor (DSP) hardware, ASIC hardware, read only memory (ROM), random access memory (RAM), and/or other storage media.

Figure 1:
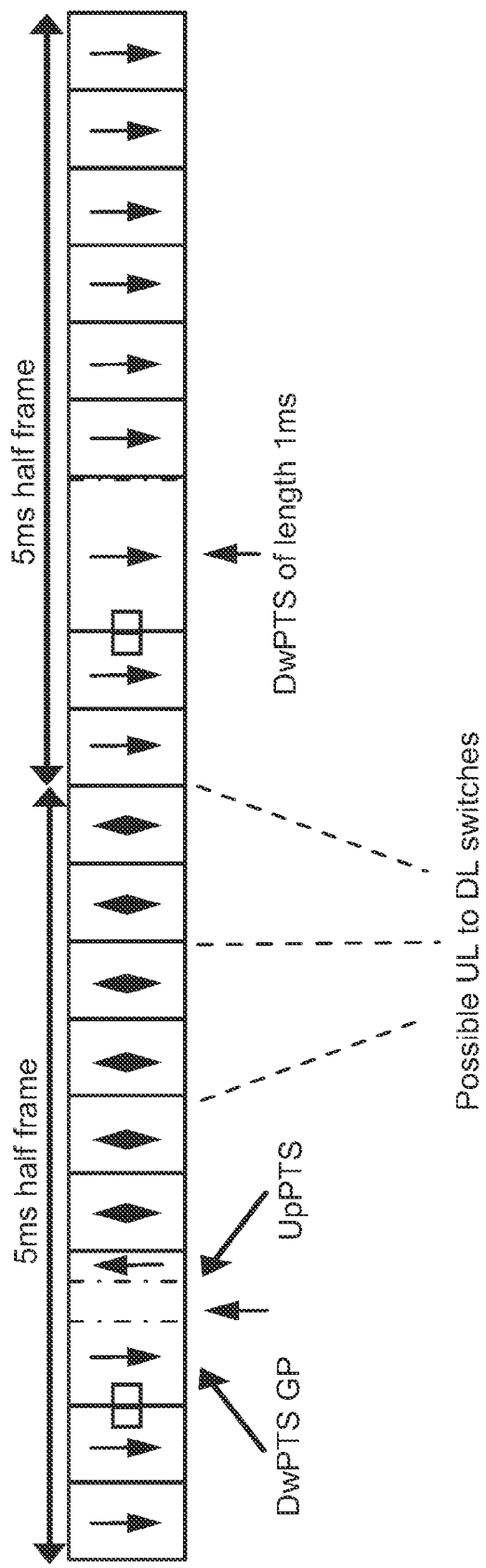
FIG. 1 illustrates an example E-UTRAN TDD frame structure.

The following example description assumes the frame and time slot shown in FIG. 1 for illustration purposes only. The present technology is applicable to the configuration of any possible measurement time duration parameter to indicate to a user equipment unit the time during which it should perform downlink measurement: time slots, sub-frames, number of symbols, etc. The term time slot is used as an encompassing term for the time duration parameter and includes sub-frame, number of symbols, or other time durations within a frame.

Figure 2:
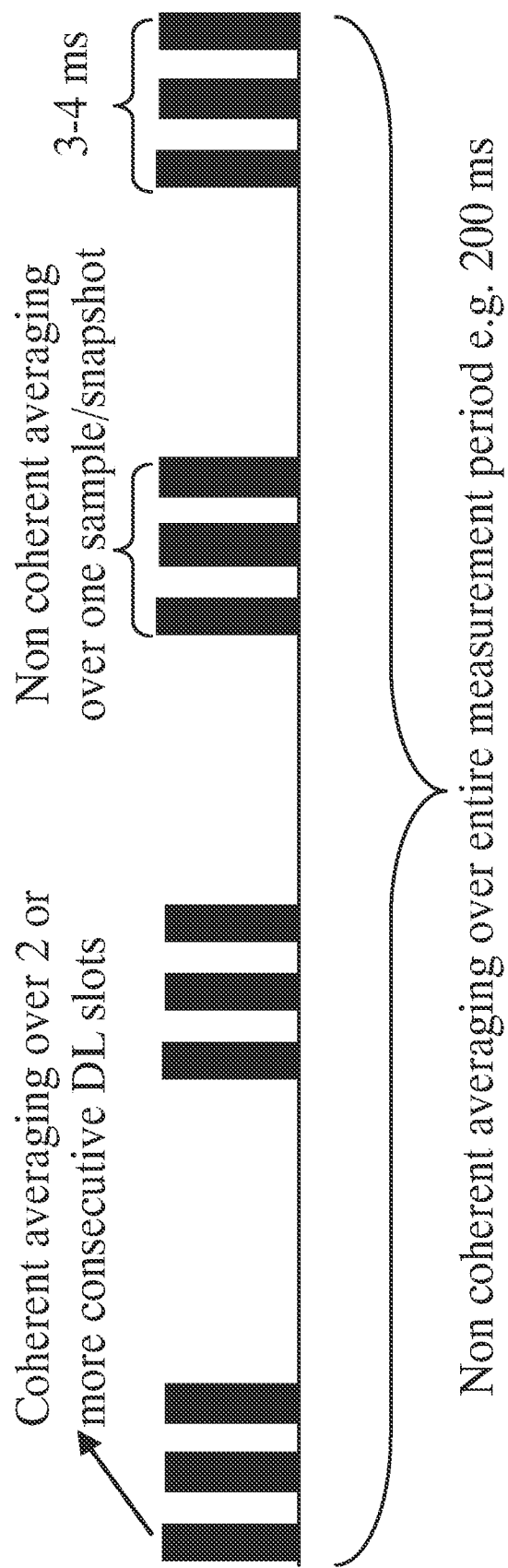
FIG. 2 illustrates an example of E-UTRAN TDD measurement averaging.

In some applications, the measurement period should be the same for the same type of UE measurements performed on cell transmissions to ensure consistency, e.g., a consistent measurement reporting delay. If this is the case, the UE should measure over the same number of downlink time slots. To ensure similar accuracy and performance, the user equipment unit preferably (but not necessarily) uses the same number of downlink time slots for performing coherent averaging (see the non-limiting example in FIG. 2 described earlier) from all neighbor cells, e.g., over three consecutive slots from all cells. Any suitable number of consecutive slots may be used, even two slots. A similar number of non-coherent averaged samples should be obtained from all cells. To provide this consistency, a configuration node determines and distributes a configuration parameter that indicates a particular number of downlink slots for UE measurements to take place in all cells. That configured number of downlink measurement time slots is preferably optimal with respect to one or more factors and is preferably adjustable in response to changes in one or more factors.

Some example factors that may be considered to obtain an optimal number of downlink slots for measurements are listed in Table 1. Table 1 shows that the lowest number of downlink slots allocated in the entire coverage area may be the upper bound on the downlink slots for measurements. However, it may not be optimal to use this upper bound value for measurements when other factors such as discontinuous reception (DRX) used by UEs and radio propagation conditions are considered.

TABLE 1

Example Factors Affecting Time Slot Allocation For UE Measurements

| No. | Factor | Description/Comments |
| --- | --- | --- |
| 1 | Uplink and downlink slot allocation in cells on a carrier | Gives upper bound on downlink (DL) time slots for UE measurements in all or a sub-set of cells. |
| 2 | Bandwidth of cells | To be used for setting trade off between slots and measurement bandwidth. |
| 3 | Addition/deletion of base station | If the time slot allocation for a new BS is different compared to neighbor cells, then configured number of measurement slots can be modified. |
| 4 | Radio propagation condition(s) | E.g., if possible, more DL time slots are used for measurement under lower Doppler and/or lower delay spread conditions. |
| 5 | Addition of new carrier frequency | Intra-frequency and inter-frequency measurements may be done over different number of slots. Inter-frequency measurement over larger bandwidth (BW) is less complex so fewer time slots can be used. |
| 6 | Change in cell planning on existing carrier frequency | DL/UL time slot allocation is changed in all or sub-set of cells. |
| 7 | Modification in radio resource management (RRM) strategies. | E.g., measurement gap patterns/periodicities are modified. |

Figure 3:
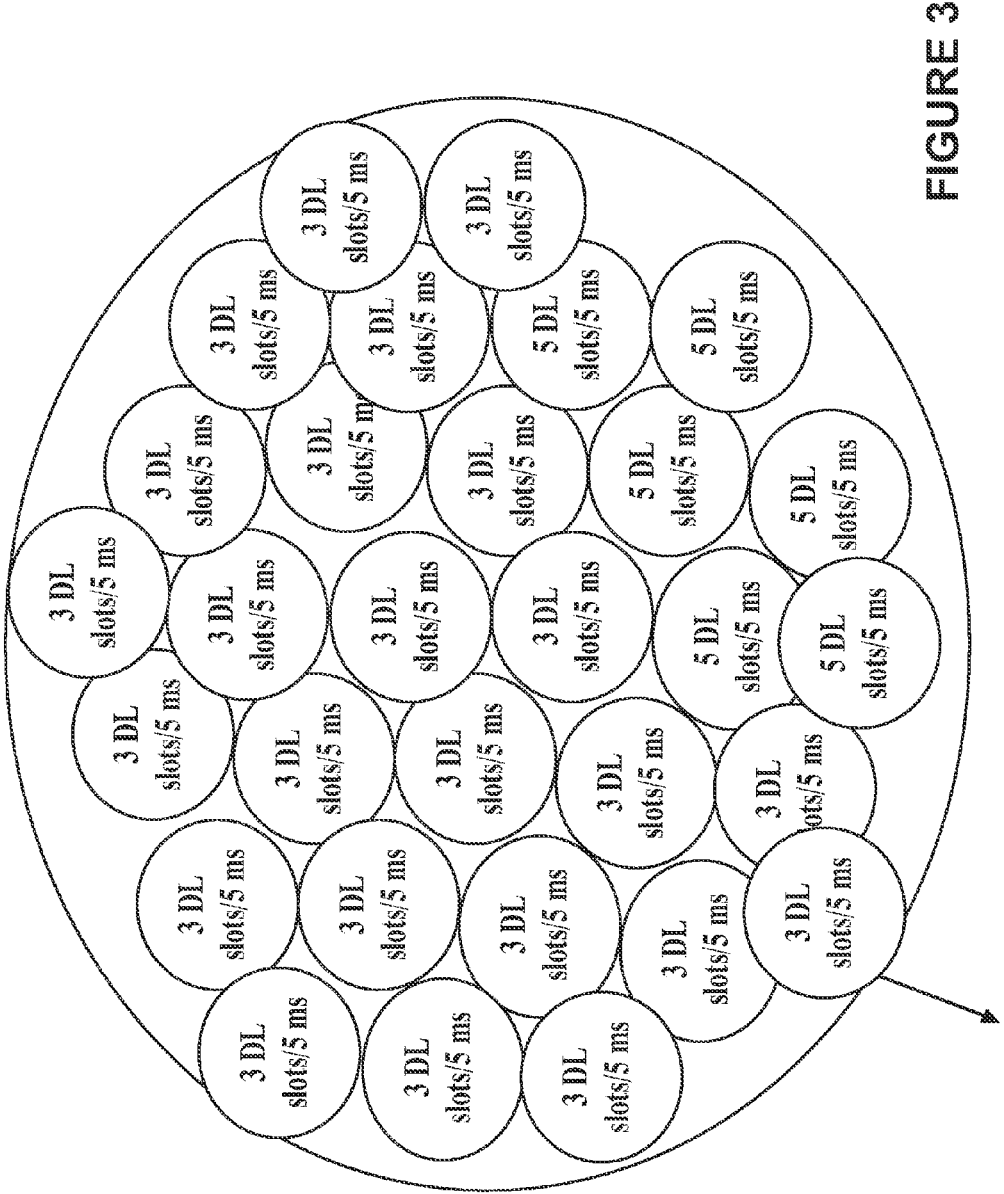
FIG. 3 is a diagram showing all cells have three slots configured for UEs to perform downlink mobility-related measurements.

The following are some measurement time slot configuration examples for configuring a number (preferably an optimal number) of downlink time slots for UE mobility-related measurements in various scenarios. A first example is a situation where the same number of downlink measurement slots are configured for all the cells in the network. Assume for example there are two different downlink time slot configurations that may be used in the cells: three or five slots per 5 ms half frame. As shown in FIG. 3, only three slots are configured for UEs to perform downlink measurements in all the cells.

Figure 4:
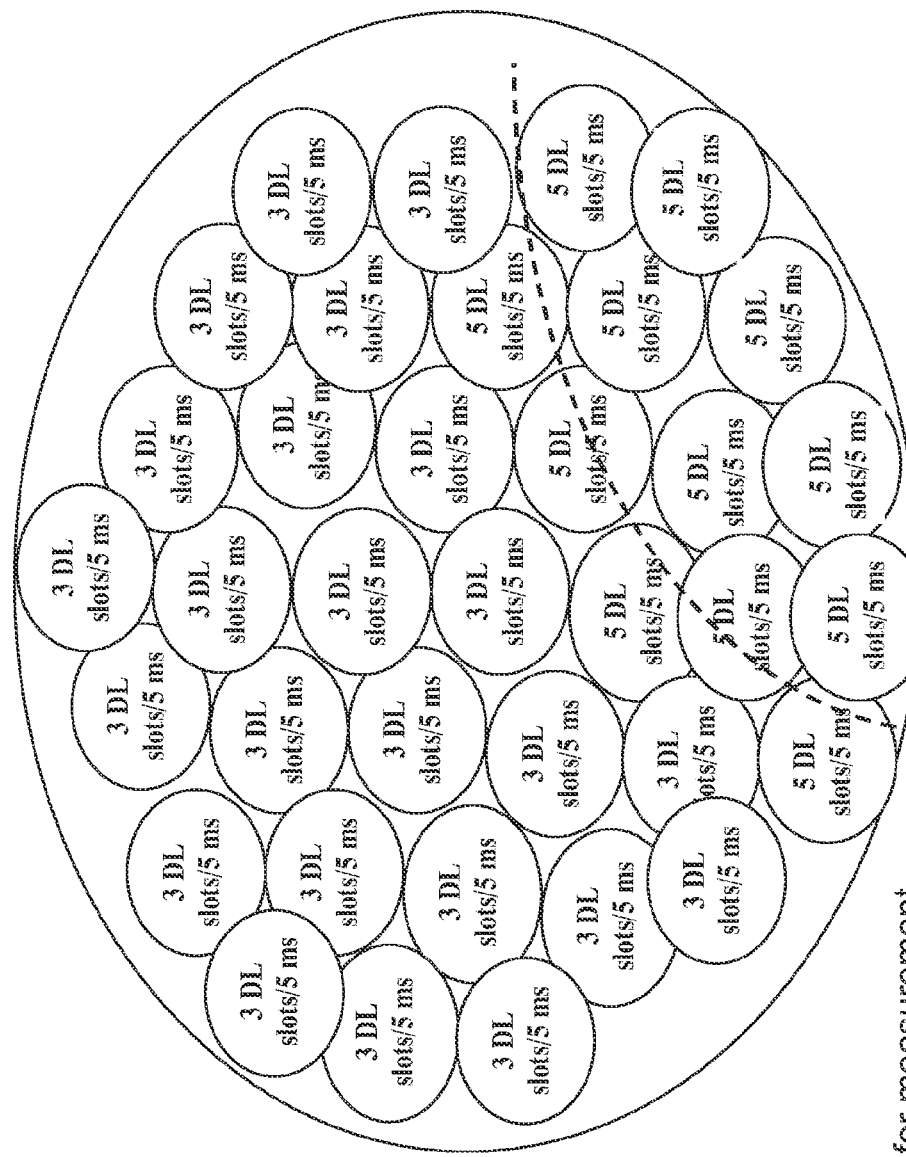
FIG. 4 is a diagram showing multiples cells in one area having three downlink slots configured for UEs to perform mobility-related measurements and multiples cells in a different area having five downlink slots configured for UEs to perform mobility-related measurements.

But configuring the same number of downlink measurement slots for all the cells in the network may not be optimal from a mobility-related UE measurement perspective in the entire coverage area. It may be possible to allocate more time slots for UE measurements in one part of the area than in another part. Such a situation is shown in the example of FIG. 4 where the number of time slots for downlink measurements depends upon the location of the cells. For instance, three time slots are allocated in a region where all cells have three downlink time slots available. On the other hand, five time slots are configured for measurements in cells where there are five downlink time slots available. This arrangement provides better measurement performance and/or more user equipment unit power saving in a region where cells use five downlink slots.

As mentioned, multiple factors or parameters may be considered. One non-limiting example is now described in conjunction with the example factors listed in Table 2 below. For example, assume that all cells are to be allocated four timeslots per 5 ms half frame (a half frame is shown in FIG. 1). An optimal configured number of downlink slots for UE mobility-related measurements is four downlink slots per 5 ms half frame, as indicated at the end of Table 2, which assumes a single DL carrier for all the cells. There are several reasons for this configuration in this non-limiting example. First, more time averaging is beneficial since the measurement bandwidth is small, i.e., in this non-limiting example, the measurement bandwidth cannot be larger than 1.4 MHz. Second, with low Doppler and low dispersion radio conditions, more time averaging is needed to properly filter out the effect of fast fading, suggesting a larger number of consecutive measurement time slots. Third, because the UEs are using DRX operation to save battery power, it is beneficial from the UE power-consumption point of view that each measurement sample (including coherent and non coherent averaging) be collected over consecutive time slots. Thus, it is advantageous from a system perspective to utilize all four available downlink slots for measurements in this scenario.

TABLE 2

Measurement time slot configuration

| No. | Parameter | Value |
|---|---|---|
| 1 | Number of carrier frequencies | 1 |
| 2 | Minimum cell bandwidth in coverage area | 1.4 MHz |
| 3 | Downlink slots per 5 ms in coverage area and same number of DL slots in all cells. | 4 |
| 4 | Radio conditions | low Doppler, low dispersion |
| 5 | DRX operation to be used | Yes |
| 6 | Configured slots for intra-frequency measurements | 4 |

Another non-limiting example is now described in conjunction with the example factors listed Table 3 below. Two downlink frequency carriers are available in the same coverage area: some cells transmit on one of the downlink frequency carriers and some cells transmit on the other. Additional parameters that need to be considered for configuring the downlink slots for mobility-related UE measurements are listed in Table 3. In this example, all cells are allocated four slots per 5 ms half frame. System bandwidth is much larger as compared to the Table 2 example, i.e., both carriers have 10 MHz bandwidth. The configured number of downlink slots for intra-frequency measurements cells using the same carrier is four per 5 ms half frame, as listed at the end of Table 2. But for inter-frequency measurements where there are two different carriers being used by different cells, only two downlink slots are configured. One reason for this difference is that for inter-frequency measurements, the full 10 MHz can be used without increasing UE complexity. Because inter-frequency measurements are carried out during gaps, the UE does not receive any data on the intra-frequency. That means that the UE can devote its resources to performing measurements. As a consequence, fewer slots can be used for time domain filtering, i.e., time and frequency domain filtering can be traded-off. The user equipment unit can use the remaining time of the measurement gap for performing other tasks such as cell search. Alternatively, the user equipment unit can go into sleep mode and save its battery if no further measurement sampling is needed.

TABLE 3

Measurement time slot configuration

| No. | Parameter | Value |
|---|---|---|
| 1 | Carrier frequencies | 2 (f1, f2) |
| 2 | Minimum cell bandwidth on f1 | 10 MHz |
| 3 | Minimum cell bandwidth on f2 | 10 MHz |
| 4 | Downlink slots per 5 ms in cells on f1. Same number of DL slots in all cells. | 4 |
| 5 | Downlink slots per 5 ms in cells on f2. Same number of DL slots in all cells. | 4 |
| 6 | Radio conditions | low Doppler, low dispersion |
| 7 | DRX operation to be used | Yes |
| 8 | Inter-frequency gap pattern: Gap length Gap periodicity | 6 ms 120 ms |
| 9 | Configured slots for intra-frequency measurements on f1 and f2 | 4 |
| 10 | Configured slots for IF measurements on f1 and f2 | 2 |

Yet in another example, if the minimum cell bandwidth on a certain carrier is small, e.g., lower than a certain threshold (e.g. 3 MHz or lower), then the number of time slots for neighbor cell measurements on that carrier should be higher because the measurement must be done over a shorter bandwidth. As described earlier, there is a tradeoff between time domain and frequency domain averaging. In this example, the larger number of measurement time slots allows the desired accuracy of the neighbor cell measurement to still be achieved. On the other hand, if the minimum cell bandwidth on a certain carrier is large enough, e.g., larger than a certain threshold (e.g. 10 MHz or more), then the number of time slots for neighbor cell measurements on that carrier can be decreased since it is possible to do the downlink measurement over a larger bandwidth and still achieve the desired accuracy.

Another non-limiting example is now described in conjunction with the example factors listed Table 4 below. It might be sufficient to configure only two downlink (DL) time slots for measurements because DRX operation is not used by UEs in "connected mode" on this carrier. This means that the UE batteries remain active continuously. As a result, each measurement sample can be obtained over larger time duration without affecting UE power consumption.

TABLE 4

Measurement time slot configuration

| No. | Parameter | Value |
|---|---|---|
| 1 | Carrier frequencies | 1 |
| 2 | Minimum cell bandwidth on f1 | 10 MHz |
| 3 | Downlink slots per 5 ms in cells on f1; ; same number of DL slots in all cells | 4 |
| 4 | Radio conditions | low Doppler, low dispersion |
| 5 | DRX operation to be used | No |
| 6 | Configured slots for intra-frequency measurements on f1 | 2 |

Figure 5:
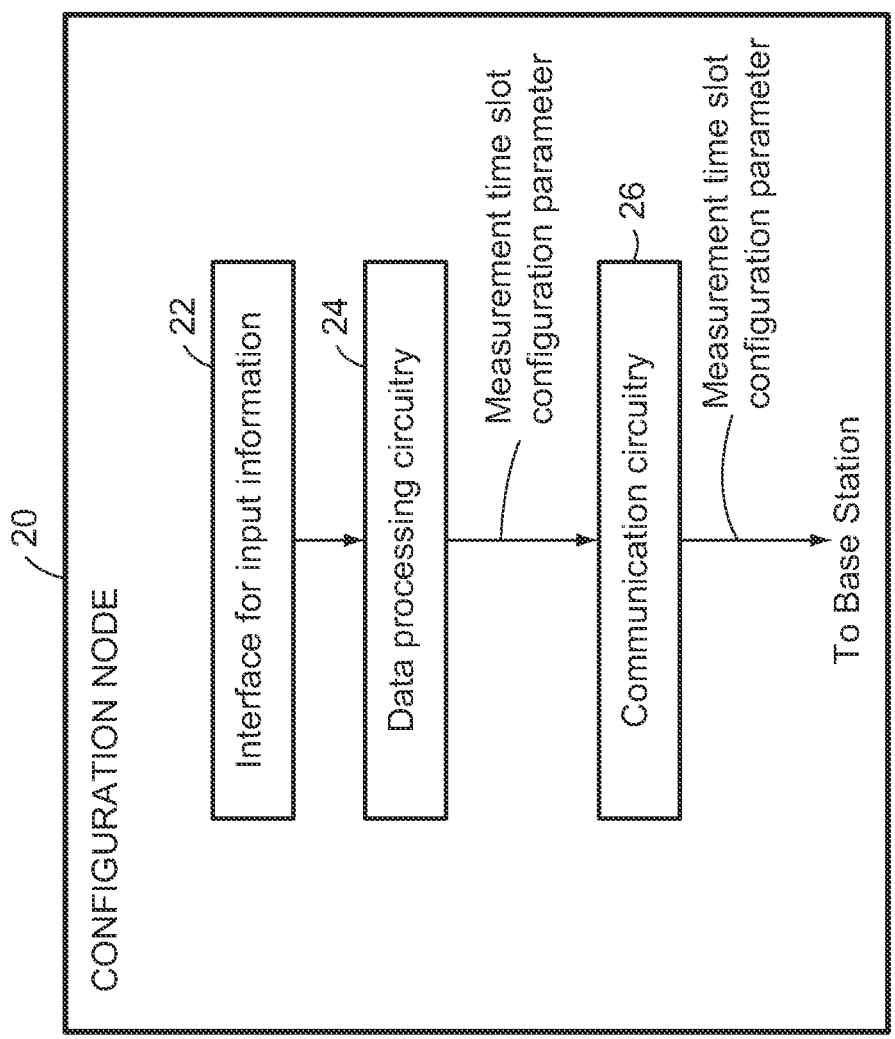
FIG. 5 is a function block diagram of a configuration node according to a non-limiting example embodiment.

The configuration node may be implemented in any suitable manner. One example is as a centralized node. FIG. 5 shows a centralized configuration node 20 according to an example embodiment. The configuration node 20 configures one or more measurement time slot parameters for all the cells in a coverage area. The centralized configuration node 20 can either be one of the base stations, a separate dedicated node, an existing operational and maintenance (O&M) node, or an operational sub-system (OSS). The centralized configuration node 20 includes an interface 22 that receives input information relevant for determining a number of downlink slots during which UEs may make mobility-related downlink measurements. Various non-limiting examples of such input information were discussed above and listed in the Tables (e.g., cell transmission bandwidth, gap patterns, number of carrier frequencies, DRX operation, slot allocation etc.). A data processor 24 receives that input information and determines a value corresponding to a configured number of downlink measurement time slots using any suitable algorithm or other process. The data processor 24 may also determine the location of those time slots within a frame and/or spacing between slots if it is determined that the time slots should not be consecutive. The data processor provides this configured number and any other related configuration data to the base stations operating in a given coverage area via communications circuitry 26.

The configuration information can be different for different carrier frequencies and can be different for different types of measurements. In addition the configuration information can also be different for intra-frequency and inter-frequency measurements, and even for the same type of measurement quantity, as shown in the previous example in Table 3. Similarly, a network may not employ the same radio resource management (RRM) strategies on different carriers. Therefore, the signaled measurement time slot configuration information is associated with one or more corresponding carrier frequencies and/or with one or more corresponding measurement quantities and would likely be different for example for RSRP and for RSRQ.

The functions of the interface 22, data processor 24, and communications circuitry 26 may be provided by a single dedicated processor, by a single shared processor, or by a plurality of individual processors, some of which may be shared or distributed. The functions of the interface 22, data processor 24, and communications circuitry 26 may be performed in conjunction with execution of coded instructions or the like which may be substantially represented in computer readable medium and so executed by a computer or processor.

A significant part of the received input may be of a static or semi-static nature (such as cell bandwidth, for example). But when a new base station or a new carrier frequency is added, removed, downgraded, or upgraded, the corresponding information (e.g., slot configuration, bandwidth, etc.) should be readily provided to the centralized configuration node 20. This allows the node 20 to reconfigure the number of downlink measurement slots in response to any relevant changes in the network, and consequently, to make sure that downlink measurements are performed over a correct combination and number of slots. Other radio resource management-related information, such as gap patterns, DRX cycle length, etc., may be considered as semi-dynamic or dynamic parameters. In DRX mode, the UE wakes up and listens to the transmission at least once every cycle which allows the UE to save its battery. For example, in a DRX cycle of 1.28 seconds, the UE wakes up once every 1.28 seconds. Input information like the radio propagation environment of the coverage area is fairly static and might be already available at the centralized node.

But even the radio environment can change in some circumstances. One example is when new base stations (normal or home base stations) are deployed in indoor environment, which was previously solely served by outdoor base stations.

The input information can be provided to the centralized configuration node 20 via existing interfaces, e.g., via an interface between the O&M and eNodeB (or base stations) or via X2 interface (eNodeB-to-eNodeB interface) in E-UTRA. The actual interface depends upon the type of centralized node used for performing configuration. Another possibility is to provide part of the information manually or via some propriety interface.

Eventually each base station (eNodeB) can signal the configured measurement time slot information to UEs in or near its coverage area so that those UEs then know how to carry out the downlink measurements. The base stations may transmit the configured measurement time slot information as system information (e.g., over a broadcast channel (BCH)) for "idle mode" UEs and on a user-specific channel (e.g., a dedicated or shared channel) for UEs in the "connected mode."

Figure 6:
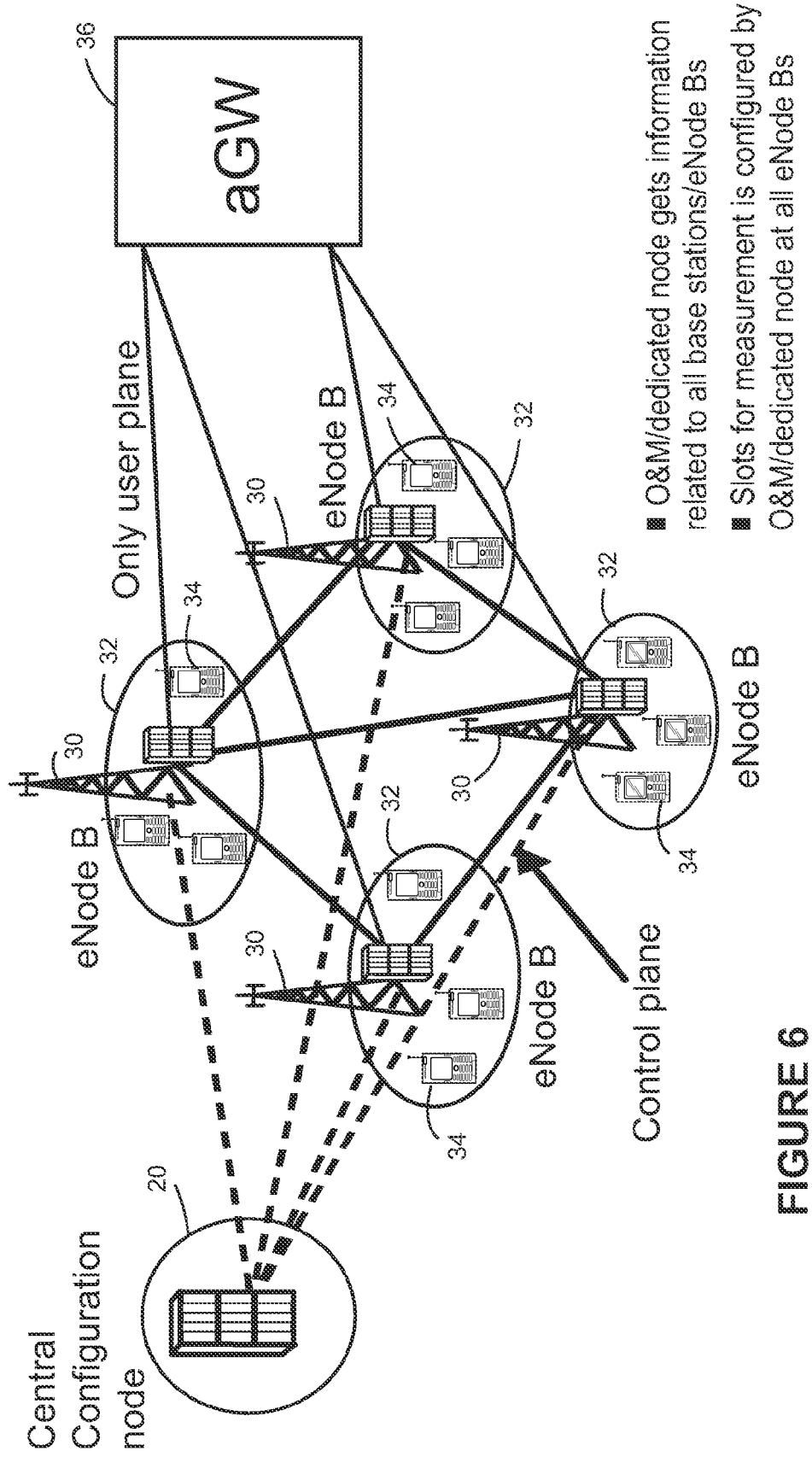
FIG. 6 is a diagram showing an example centralized configuration method via an operation and management (O&M) dedicated node in E-UTRA TDD.

FIG. 6 shows a network with multiple base stations (eNodeBs) 30 each having a coverage area 32 and serving multiple UEs 34. The base stations are coupled to a gateway node (e.g., aGW) 36 and to a separate configuration node 20 (e.g., a dedicated node or an O&M node). The configuration node 20 receives input information from the base stations (eNodeBs) 30 and eventually provides the configured measurement time slot information to all base stations (eNodeBs) 30 over the control plane.

Figure 7:
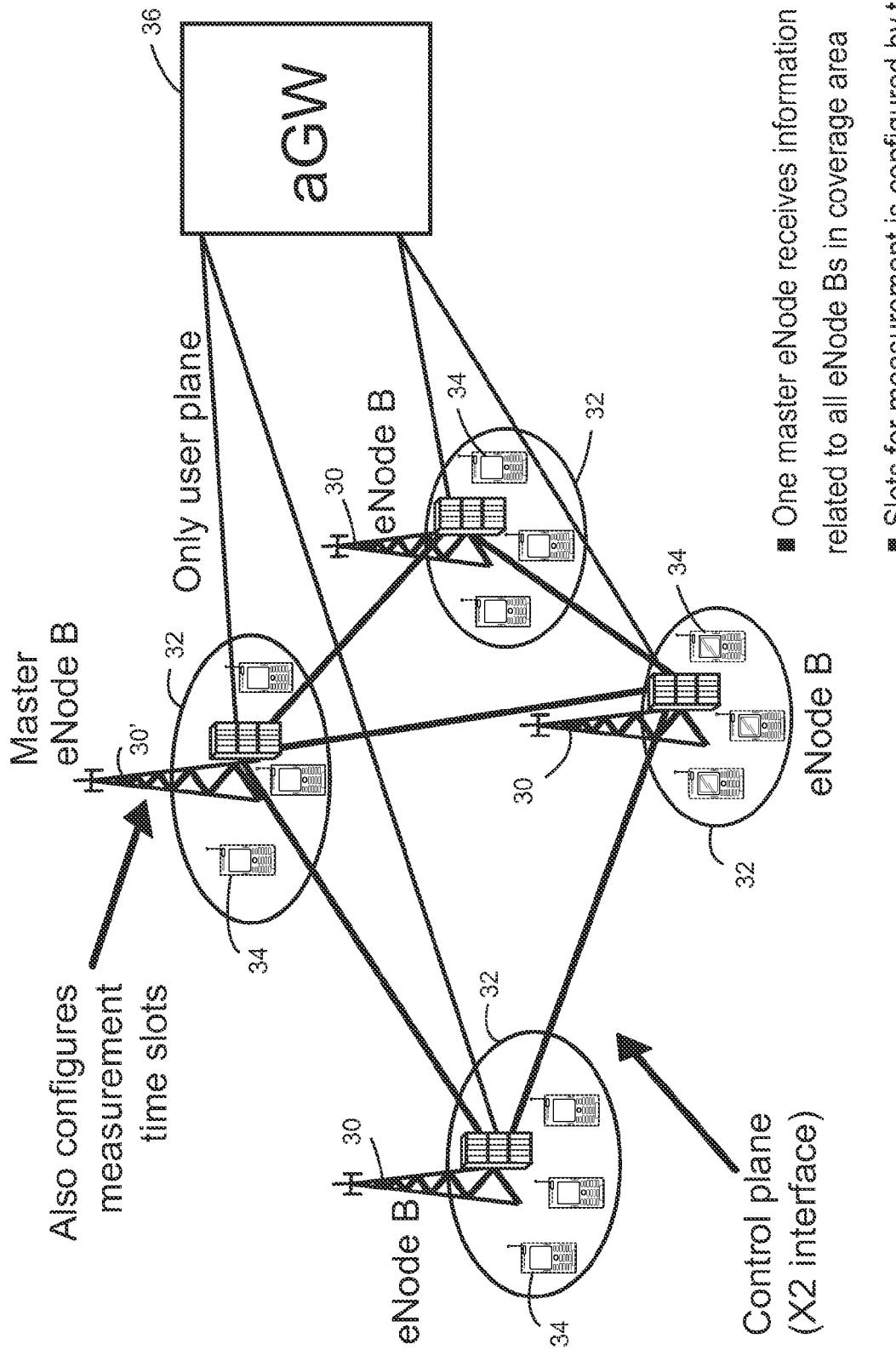
FIG. 7 is a diagram showing another example configuration method via an existing eNode B in E-UTRA TDD.

FIG. 7 illustrates another example where one of the base stations 30' performs the functions of the configuration node 20 (labeled "master eNodeB"). Another example implementation is a distributed configuration method at each base station (eNodeB) 30 via inter-base station (eNodeB) 30 communication.

In the distributed approach, each base station receives the input information needed for determining the measurement time slot configuration information. Each base station receives the information from all or a sub-set of base stations in a particular coverage area and is preconfigured or has available rules for determining the configuration of the downlink time slots for measurement. As a result, within a given coverage area, all base stations communicate the same number (as well as the same combination) of time slots for measurement over a given carrier frequency. With regard to FIG. 4, all base stations can be pre-configured to use 3 time slots for measurements]. Thus, when any input parameter that could influence the number of slots for measurement is modified, one or more of the base stations then re-determine appropriate, adjusted measurement time slot configuration information.

In one example embodiment, after such a re-determination, each base station starts using the new measurement time slot configuration information without informing other base stations with the assumption that all of the base stations will re-determine the new measurement time slot configuration information. Another approach is for the base station that initially re-determines the new measurement time slot configuration information communicates it to all or a sub-set of base stations in the coverage area. Each base station then starts using the new measurement time slot configuration information only after receiving a confirmation from one or more neighboring base stations.

As compared to a centralized approach, the distributed approach can lead to more signaling exchange between the base stations. But one advantage with the distributed approach is that no separate or dedicated node is needed for performing measurement time slot configuration.

The technology described herein and/or encompassed hereby applies to any wireless communication system employing a TDD frame structure, e.g., Mobile WiMax, UTRAN TDD, etc. and permits consistency and coordination between cells and improved performance so that UEs are informed of a sufficient and hopefully optimal number of downlink slots for mobility-related measurements. The configuration of measurement time slots takes into account various combinations of environment and scenarios, e.g., a heterogeneous cell transmission bandwidth deployment scenario. In a heterogeneous scenario, cells have different transmission bandwidths, e.g., some might have 5 MHz whereas others might have 10 MHz. The configured number of time slots for mobility-related measurements can be conveniently modified in response to changes in cell planning, network upgrade, etc. Moreover, UE power consumption can be reduced in DRX operation by appropriately configuring measurement time slots.

The particulars of the detailed description should not be construed as limiting the scope of the claims but as merely providing illustrations of some of the presently preferred embodiments. The scope of this invention should be determined by the appended claims and their legal equivalents. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Moreover, it is not necessary for a device or method to address each and every problem sought to be solved by the present technology, for it to be encompassed hereby. Furthermore, no element, component, or method step in the present disclosure is intended to be dedicated to the public.

What is claimed is:

1. A method implemented in a configuration node useable in a time division duplex "TDD" radio network where uplink and downlink slots are transmitted over the same carrier frequency and that has multiple cell areas, each cell area associated with a radio base station in which mobile terminals communicate with at least one of the base stations over a radio interface, where the mobile terminals perform mobility-related measurements on downlink signals received from a corresponding neighbor cell during time slots configured for downlink transmission measurement, the method implemented in the configuration node comprising:
   receiving input information,
   determining mobility-related measurement time slot configuration information based on the received input information, and
   providing the measurement time slot configuration information to the at least one base station, thereby enabling the measurement time slot configuration information to be signaled from the base station to mobile terminals.

2. A method according to claim 1, wherein the input information includes one or more carrier frequencies used in each of the cell areas, and wherein the measurement time slot configuration information provided to the base stations indicates at least one measurement time slot for each carrier frequency.

3. A method according to claim 1, wherein the input information includes uplink and downlink time slot allocations on each carrier frequency in each of the cell areas, and wherein the measurement time slot configuration information provided to the base stations indicates a first minimum number of downlink measurement time slots for each carrier frequency in all cell areas and a second number of downlink measurement time slots for each carrier frequency in one or more of the cell areas, wherein the second number of downlink measurement time slots is larger than the first number of downlink measurement time slots.

4. A method according to claim 1, wherein the input information includes one or both of maximum transmission bandwidth of cells on a carrier frequency for each carrier frequency or minimum transmission bandwidths of cells on a carrier frequency for each carrier frequency, and
   wherein the measurement time slot configuration information provided to the base stations indicates a first number of downlink measurement time slots if a transmission bandwidth available in each cell is greater than a bandwidth threshold or a second number of downlink measurement time slots if a transmission bandwidth available in each cell is less than or equal to the bandwidth threshold, wherein the second number of downlink measurement time slots is higher than the first lower number of downlink measurement time slots.

5. A method according to claim 1, wherein the input information includes radio condition information, and
   wherein the measurement time slot configuration information provided to the base stations indicates a first number of downlink measurement time slots if the radio condition information reflects first radio channel conditions characterized by first Doppler and first delay spread and a second number of downlink measurement time slots if the radio condition information reflects second radio channel conditions characterized by second Doppler and second delay spread, wherein the second number of downlink measurement time slots is lower than the first higher number of downlink measurement time slots, the second radio channel conditions is faster then the first slower radio channel conditions and the second Doppler and second delay spread is higher than the first lower Doppler and first lower delay spread, respectively.

6. A method according to claim 1, wherein during periodic idle gaps, mobile terminals may make inter-frequency measurements on reference signals from neighboring cells operating on a different downlink carrier frequency than in a serving cell for each mobile terminal, the input information includes idle gap periodicity information, and the measurement time slot configuration information provided to the base stations indicates a first number of downlink measurement time slots if a periodicity of an idle gap occurrence is greater than a threshold and a second number of downlink measurement time slots if the periodicity of the idle gap occurrence is less than or equal to the threshold, wherein the second number of downlink measurement time slots is lower than the first higher number of downlink measurement time slots.

7. A method according to claim 1, wherein the input information includes whether the mobile radios are to make intra-frequency measurements or inter-frequency measurements, and
   wherein the measurement time slot configuration information provided to the base stations indicates a first number of downlink measurement time slots for intra6 frequency measurements and a second lower number of downlink measurement time slots for inter-frequency measurements, wherein the second number of downlink measurement time slots is lower than the first higher number of downlink measurement time slots.

8. A method according to claim 1, wherein the input information includes whether the mobile radios are to make intra-frequency measurements, and wherein the measurement time slot configuration information provided to the base stations indicates a first number of downlink measurement time slots if intra-frequency measurements are performed over bandwidth larger than a first threshold or a second number of downlink measurement time slots if intra-frequency measurements are performed over bandwidth lower than a second threshold, wherein the second number of downlink measurement time slots is higher than the first lower number of downlink measurement time slots.

9. A method according to claim 1, wherein the input information includes whether the mobile radios are to make inter-frequency measurements, and wherein the measurement time slot configuration information provided to the base stations indicates a first number of downlink measurement time slots if inter-frequency measurements are performed over bandwidth larger than a first threshold or a second number of downlink measurement time slots if inter-frequency measurements are performed over bandwidth lower than a second threshold, wherein the second number of downlink measurement time slots is higher than the first lower number of downlink measurement time slots.

10. A method according to claim 1, wherein the input information includes discontinuous reception (DRX) cycle information and the measurement time slot configuration information provided to the base stations indicates a first number of downlink measurement time slots for intra-frequency measurements and a second number of downlink measurement time slots for inter-frequency measurements, wherein the second number of downlink measurement time slots is relatively lower than the first higher number of downlink measurement time slots.

11. A method according to claim 1, wherein the input information includes base station or cell deployment information or cell planning modification information, and wherein the measurement time slot configuration information provided to the base stations indicates a different number of downlink measurement time slots based on the base station or cell deployment information or the cell planning modification information.

12. A method according to claim 1, wherein the input information includes radio resource management information comprising a gap pattern in use for performing measurements, and wherein the measurement time slot configuration information provided to the base stations varies depending on the radio resource management information.

13. A method according to claim 1, wherein the measurement time slot configuration information includes an optimal number of downlink timeslots during which the mobile terminals should make the neighbor cell measurements.

14. A method according to claim 13, wherein the optimal number is variable depending on input information.

15. A method according to claim 1, wherein the configuration node is one of a dedicated node connected to the base stations, an operational and maintenance node connected to the base stations or one or more of the base stations.

16. A method according to claim 15, wherein the radio network is an E UTRAN and the one or more base stations are connected to other base stations via an X2 interface and receive the input information via the X2 interface.

17. A method according to claim 16, wherein the one or more base stations signal one or more measurement time slot parameters to the other base stations via the X2 interface.

18. A method according to claim 1, wherein the neighbor cell measurements include a signal strength measurement such as reference symbol received power (RSRP) and/or a signal quality measurement such as reference symbol received quality (RSRQ).

19. A method according to claim 1, wherein the measurement time slot configuration information may be signaled to the mobile terminals in an idle mode.

20. A method according to claim 1, wherein the measurement time slot configuration information may be signaled to the mobile terminals via a dedicated or shared data channel to the mobile terminals in a connected mode.

21. A method according to claim 1, wherein the measurement time slot corresponds to a sub-frame.

22. A method according to claim 1, wherein the measurement time slot is expressed in symbols or any other suitable time unit.

23. Apparatus implemented in a configuration node useable in a time division duplex "TDD" radio network where uplink and downlink slots are transmitted over the same carrier frequency and that has multiple cell areas each cell area associated with a radio base station in which mobile terminals communicate with at least one of the base stations over a radio interface, where the mobile terminals perform mobility-related neighbor cell measurements on downlink signals received from a corresponding neighbor cell during time slots configured for downlink transmission measurement, the apparatus comprising:

an interface arranged to receive input information, data processing circuitry arranged to determine mobility-related measurement time slot configuration information based on the received input information, and communication circuitry arranged to send the measurement time slot configuration information to the at least one base station, thereby enabling the measurement time slot configuration information to be signaled from the base station to mobile terminals.

24. An apparatus according to claim 23, wherein the input information includes one or more carrier frequencies used in each of the cell areas, and wherein the measurement time slot configuration information provided to the base stations indicates at least one measurement time slot for each carrier frequency.

25. An apparatus according to claim 23, wherein the input information includes uplink time and downlink slot allocations on each radio carrier frequency in each of the cell areas, and wherein the measurement time slot configuration information provided to the base stations indicates a first minimum number of downlink measurement time slots for each carrier frequency in all cell areas and a second number of downlink measurement time slots for each carrier frequency in one or more of the cell areas, wherein the second number of downlink measurement time slots is larger than the first number of downlink measurement time slots.

26. An apparatus according to claim 23, wherein the input information includes one or both of a maximum transmission bandwidth of cells on a carrier frequency for each carrier frequency or a minimum transmission bandwidths of cells on a carrier frequency for each carrier frequency, and wherein the measurement time slot configuration information provided to the base stations indicates a first number of downlink measurement time slots if a transmission bandwidth available in each cell is greater than a bandwidth threshold or a second number downlink measurement time slots if a transmission bandwidth available in each cell is less than or equal to the bandwidth threshold, wherein the second number of downlink measurement time slots is higher than the first lower number of downlink measurement time slots.

27. An apparatus according to claim 23, wherein the input information includes radio condition information, and
wherein the measurement time slot configuration information provided to the base stations indicates a first number of downlink measurement time slots if the radio condition information reflects first radio channel conditions characterized by first Doppler and first delay spread and a second number of downlink measurement time slots if the radio condition information reflects second radio channel conditions characterized by second Doppler and second delay spread, wherein the second number of downlink measurement time slots is lower than the first higher number of downlink measurement time slots, the second radio channel conditions is faster then the first slower radio channel conditions and the second Doppler and second delay spread is higher than the first lower Doppler and first lower delay spread, respectively.

28. An apparatus according to claim 23, wherein:
during periodic idle gaps, mobile terminals may make inter-frequency measurements on reference symbols from neighboring cells operating on a different downlink carrier frequency than in a serving cell for each mobile terminal,
the input information includes gap pattern information, and
the measurement time slot configuration information provided to the base stations indicates a first number of downlink measurement time slots if a periodicity of an idle gap occurrence is greater than a threshold and a second number of downlink measurement time slots if the periodicity of the idle gap occurrence is less than or equal to the threshold, wherein the second number of downlink measurement time slots is lower than the first higher number of downlink measurement time slots.

29. An apparatus according to claim 23, wherein the input information includes whether the mobile radios are to make intra-frequency measurements or inter-frequency measurements, and
wherein the measurement time slot configuration information provided to the base stations indicates a first number of downlink measurement time slots for intra frequency measurements and a second number of downlink measurement time slots for inter-frequency measurements, wherein the second number of downlink measurement time slots is lower than the first higher number of downlink measurement time slots.

30. An apparatus to claim 23, wherein the input information includes whether the mobile radios are to make intra-frequency measurements, and
wherein the measurement time slot configuration information provided to the base stations indicates a first number of downlink measurement time slots if intra-frequency measurements are performed over bandwidth larger than a first threshold or a second number of downlink measurement time slots if intra-frequency measurements are performed over bandwidth lower than a second threshold, wherein the second number of downlink measurement time slots is higher than the first lower number of downlink measurement time slots.

31. An apparatus according to claim 23, wherein the input information includes whether the mobile radios are to make inter-frequency measurements, and
wherein the measurement time slot configuration information provided to the base stations indicates a first number of downlink measurement time slots inter-frequency measurements are performed over bandwidth larger than a first threshold or a second number of downlink measurement time slots if inter-frequency measurements are performed over bandwidth lower than a second threshold, wherein
the second number of downlink measurement time slots is higher than the first lower number of downlink measurement time slots.

32. An apparatus according to claim 23, wherein the input information includes discontinuous reception (DRX) cycle information and the measurement time slot configuration information provided to the base stations indicates a first number of downlink measurement time slots for intra-frequency measurements and a second number of downlink measurement time slots for inter-frequency measurements, wherein the second number of downlink measurement time slots is relatively lower than the first higher number of downlink measurement time slots.

33. An apparatus according to claim 23, wherein the input information includes base station or cell deployment information or cell planning modification information, and
wherein the measurement time slot configuration information provided to the base stations indicates a different number of downlink measurement time slots based on the base station or cell deployment information or the cell planning modification information.

34. An apparatus according to claim 23, wherein the input information includes radio resource management information comprising a gap pattern for use in performing measurements, and wherein the measurement time slot configuration information provided to the base stations varies depending on the radio resource management information.

35. An apparatus according to claim 23, wherein the measurement time slot configuration information includes an optimal number of downlink timeslots during which the mobile terminals should make the neighbor cell measurements.

36. An apparatus according to claim 35, wherein the optimal number is variable depending on input information.

37. An apparatus according to claim 23, wherein the configuration node is implemented as one of a dedicated node connected to the base stations, an
operational and maintenance node connected to the base stations, in one or more of the base stations.

38. An apparatus according to claim 37, wherein the radio network is an E-UTRAN and the one or more base station are connected to other base stations via an X2 interface and receive the input information via the X2 interface.

39. An apparatus according to claim 38, wherein the one base station signals one or more measurement time slot parameters to the base stations via the X2 interface.

40. An apparatus according to claim 23, wherein the neighbor cell measurements include reference symbol received power and carrier received signal strength.

41. A method useable in a lime division duplex "TDD" radio network where uplink and downlink slots are transmitted over the same carrier frequency and that has multiple cell areas each cell area associated with a radio base station in which mobile terminals communicate with at least one of the base stations over a radio interface, where the mobile terminals perform mobility-related measurements on downlink signals received from a corresponding neighbor cell during time slots configured for downlink transmission measurement, the method implemented in one of the base stations comprising:
- receiving mobility-related measurement time slot configuration information, and
- transmitting the mobility-related measurement time slot configuration information to mobile terminals in or near a cell associated with the one base station.

42. A method according to claim 41, further comprising:
- receiving modified mobility-related measurement time slot configuration information, and
- transmitting the modified mobility-related measurement time slot configuration information to mobile terminals in or near a cell associated with the one base station.

43. A method according to claim 1, wherein the mobility-related measurement time slot configuration specifies one or more time slots during which the mobile terminal is to perform the mobility-related measurements on the downlink signals received from the corresponding neighbor cell.

44. An apparatus according to claim 23, wherein the mobility-related measurement time slot configuration specifies one or more time slots during which the mobile terminal is to perform the mobility-related measurements on the downlink signals received from the corresponding neighbor cell.

45. A method according to claim 41, wherein the mobility-related measurement time slot configuration specifies one or more time slots during which the mobile terminal is to perform the mobility-related measurements on the downlink signals received from the corresponding neighbor cell.

* * * * *

UNITED STATES PATENT AND TRADEMARK OFFICE
CERTIFICATE OF CORRECTION

PATENT NO. : 8,441,951 B2  Page 1 of 1
APPLICATION NO. : 12/863861
DATED : May 14, 2013
INVENTOR(S) : Kazmi et al.

It is certified that error appears in the above-identified patent and that said Letters Patent is hereby corrected as shown below:

On the Title Page, Item (73), under "Assignee", in Column 1, Line 1,
delete "Telefonatiebolaget" and insert -- Telefonaktiebolaget --, therefor.

On Title Page 2, Item (56), under "OTHER PUBLICATIONS", in Column 2, Line 3,
delete "form" and insert -- from --, therefor.

In the Specification

In Column 4, Line 62, delete "MIL" and insert -- MHz --, therefor.

In the Claims

In Column 16, Line 38, in Claim 5, delete "then" and insert -- than --, therefor.

In Column 16, Lines 62-63, in Claim 7, delete "intra6 frequency" and insert
-- intra-frequency --, therefor.

In Column 17, Line 7, in Claim 8, delete "arc" and insert -- are --, therefor.

In Column 17, Line 16, in Claim 9, delete "arc" and insert -- are --, therefor.

In Column 17, Line 24, in Claim 9, delete "arc" and insert -- are --, therefor.

In Column 18, Line 21, in Claim 23, delete "Apparatus" and insert -- An apparatus --, therefor.

In Column 19, Line 23, in Claim 27, delete "then" and insert -- than --, therefor.

In Column 19, Line 57, in Claim 30, delete "to claim" and insert -- according to claim --, therefor.

In Column 20, Line 55, in Claim 38, delete "arc" and insert -- are --, therefor.

Signed and Sealed this
Tenth Day of December, 2013

Margaret A. Focarino
*Commissioner for Patents of the United States Patent and Trademark Office*